June 3, 1930.  C. M. SILBERBERGER  1,762,034
ROLLER DRIVE
Filed July 11, 1928
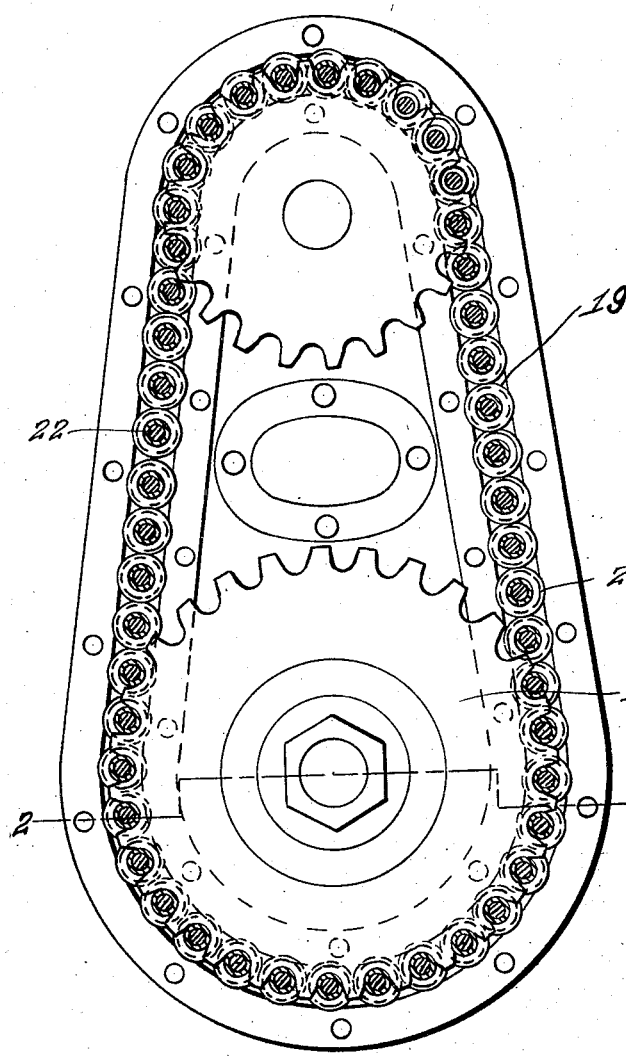
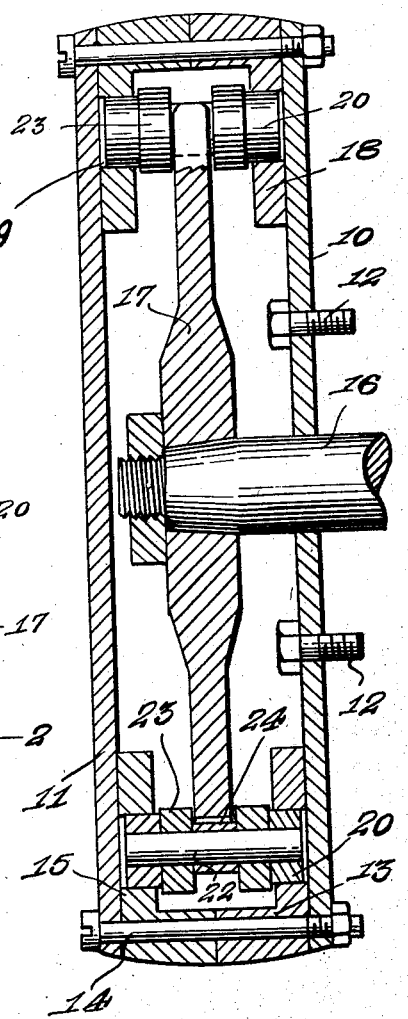
Cecil M. Silberberger,
INVENTOR
BY Victor J. Evans
ATTORNEY
WITNESS:

Patented June 3, 1930

1,762,034

UNITED STATES PATENT OFFICE

CECIL MERWIN SILBERBERGER, OF FREDERICK, SOUTH DAKOTA

ROLLER DRIVE

Application filed July 11, 1928. Serial No. 291,822.

This invention relates to an improved type of drive connection embodying roller members.

An object of the invention comprehends a track for the roller members adapted to be extended around and about gear members.

Another object of the invention contemplates guide members carried by the rollers adapted to prevent displacement of the gears from the rollers, whereby the power transmitted thereby will be a pushing rather than a pulling force in contra-distinction to that of the employment of chains, which generally whip or lash.

With the above and other objects in view, the invention further consists of the following novel features and details of construction, to be hereinafter more fully described, illustrated in the accompanying drawing and pointed out in the appended claim.

In the drawing:—

Figure 1 is a longitudinal sectional view taken through my improved type of drive connection disclosing the arrangement thereof when used as the means of connection between sprockets.

Figure 2 is a sectional view taken on line 2—2 of Figure 1.

Referring to the drawing in detail, wherein like characters of reference denote corresponding parts, the reference characters 10 and 11 indicate the companion halves of a housing which may be disposed in any desired position and anchored by cap screws or other fastening elements, such as indicated at 12.

Spacing blocks 13, carried upon the inner sides of the plates 10 and 11 adjacent the outermost peripheries thereof, are provided with registering bores to accommodate bolt members 14. Annular shoulders, inwardly directed from the spacing blocks 13, are adapted to repose against the inner sides of the plates 10 and 11, the purpose of which will be presently apparent.

As illustrated in Figure 2 of the drawing, a shaft 16, extended through the plate 10, carries a gear, preferably a sprocket gear, such as indicated at 17, upon the aforementioned end and having the periphery or teeth therefore disposed in spaced relation to the spacing blocks 13.

Rings 18, carried upon the inner sides of the plates 10 and 11 and disposed in slight spaced relation to that of the shoulders 15 upon the opposed blocks 13, are adapted to provide annular raceways 19 upon diametrically opposite sides within the housing.

Roller members 20, which will be hereinafter referred to as outside rollers, positioned within the raceways 19 as defined between the shoulders 15 of the spacing blocks 13 and the rings 18, are adapted for loose connection with the ends of roller shafts 22.

Inside rollers 23, fixed upon the shaft 22 and arranged upon either side of the toothed periphery of the gear 17, are adapted to retain the outside rollers 20 within the respective raceways.

A sprocket roller 24 is loosely mounted upon that portion of the shaft 22 between the inside rollers 23 and which is adapted to be interposed between the teeth of the sprocket 17.

The drawing has disclosed my drive connection as forming the means of driving connection between sprocket wheels or gears similar to that of the chain drive timing mechanisms of internal combustion engines.

As noted both gears are arranged within the courses inscribed by the raceways whereby the roller members are arranged upon the outsides of the gears and when the latter are called into use the roller members will be forced around in nearly circuitous movements whereby the centrifugal force attained thereby would naturally tend to retain the rollers between the teeth of the gears. The raceways or tracks will also prevent whipping and inasmuch as no linkage connection is provided between the individual rollers, binding action will be obviated. Furthermore the rollers can not climb the sprocket gears, because each of the rollers is individually positioned between the teeth of the gears.

The inside rollers 23 are furthermore adapted to provide guides or raceways therebetween within which the toothed peripheries of the sprocket gears will be guided.

The power transmitted from the driving to the driven gear, through the instrumentality of the present roller drive connection, will be a pushing rather than a pulling force in contro-distinction to that of chains, inasmuch as the links therefor provide the means of pulling, whereas the pushing effect of chains would merely buckle up the links therefor and cause same to ride and climb the sprockets.

The invention is susceptible of various changes in its form, proportions and minor details of construction, and the right is herein reserved to make such changes as properly fall within the scope of the appended claim.

Having thus described the invention, what is claimed is:—

A drive connection comprising a housing provided with oppositely located raceways, shaft members having the ends therefor disposed within the raceways, roller members loosely mounted upon the ends of the shafts disposed within and engageable tangentially thereof with said raceways, roller members included upon the intermediate portions of the shafts, and spacing elements carried by the shafts at the ends of the roller members to insulate and prevent displacement of both the intermediate and end rollers.

In testimony whereof I affix my signature.

CECIL MERWIN SILBERBERGER.